United States Patent [19]

Calve et al.

[11] Patent Number: 4,579,892

[45] Date of Patent: Apr. 1, 1986

[54] NH4 SSL-PF THERMOSETTING RESIN AND METHOD OF BINDING LIGNOCELLULOSIC MATERIAL EMPLOYING SAME

[75] Inventors: Louis R. Calve, Alymer; Gilles G. Brunette, Hull, both of Canada

[73] Assignee: Forintek Canada Corp., Ottawa, Canada

[21] Appl. No.: 615,080

[22] Filed: May 29, 1984

[30] Foreign Application Priority Data

May 31, 1983 [CA] Canada ................................. 429292

[51] Int. Cl.$^4$ ........................... C08G 8/10; B29C 5/00
[52] U.S. Cl. ....................................... 524/14; 524/73; 524/74; 524/735; 528/143; 528/145; 264/123; 264/126; 264/331.22
[58] Field of Search ........................ 524/13, 14, 72, 73, 524/74, 735; 528/143, 145; 264/109, 123, 126, 331.22; 106/123.1

[56] References Cited

U.S. PATENT DOCUMENTS

| | | | |
|---|---|---|---|
| 2,786,008 | 3/1957 | Herschler | 527/403 |
| 3,940,352 | 2/1976 | Wennerblom et al. | 527/403 |
| 4,105,606 | 8/1978 | Forss et al. | 524/74 |
| 4,127,544 | 11/1978 | Allan | 527/403 |

*Primary Examiner*—John Kight
*Assistant Examiner*—Nathan M. Nutter
*Attorney, Agent, or Firm*—Frishauf, Holtz, Goodman & Woodward

[57] ABSTRACT

A low cost method of binding lignocellulosic materials utilizing a novel ammonium based spent sulphite liquor, with phenol and formaldehyde or phenol-formaldehyde thermosetting resin as the binder is disclosed. Phenol-formaldehyde which normally reacts with ammonium lignosulfonate under acidic conditions and is unstable under these conditions, can be dispersed or otherwise held in suspension and can be mixed direct with the material by spraying. The constituents of the novel binder can also be mechanically dispersed when in dry powder form. The binder has improved adhesion characteristics and a shorter cure time over existing binders using a spent sulphite liquor base when in combination with phenol-formaldehyde.

16 Claims, No Drawings

NH₄ SSL-PF THERMOSETTING RESIN AND METHOD OF BINDING LIGNOCELLULOSIC MATERIAL EMPLOYING SAME

BACKGROUND

This invention relates to a novel method of bonding lignocellulosic materials and to a new and useful thermosetting binder employed in bonding same.

The most commonly used adhesive binders for bonding lignocellulosic materials into, for example, particleboard and waferboard are thermosetting urea-formaldehyde (UF) and phenol-formaldehyde (PF) resins; with the more expensive phenol-formaldehyde thermosetting resin being used for exterior grade products. As the UF and PF resins are petroleum based synthetic resins, from an economic standpoint, the reconstituted wood products industry has attempted to develop suitable interior and exterior adhesive substitutes from wood waste in order to solve environmental disposal problems and to reduce the industry's dependence upon the uncertain supplies and cost of petroleum based resins.

There have been numerous proposals for utilizing spent sulfite liquor (SSL), the by-product of the sulfite pulping process, as a adhesive binder for particleboard and waferboard but none of these proposals has to date, proven entirely satisfactory.

In context of employing ammonium lignosulfonate which can also be described as ammonium based spent sulfite liquor (NH₄SSL), various attempts have been made to cross-link the PF with the NH₄SSL. For example, Herschler in U.S. Pat. No. 2,786,008 issued Mar. 19, 1953 discloses the use of a binder consisting of an aqueous solution of phenol-formaldehyde with ammonium based sulfite liquor. Herschler recognized that ammonium based spent sulfite liquor which is acidic in character was not miscible with phenol-formaldehyde, since upon mixing, the resin would precipitate out. This was overcome by making the PF "acid tolerant" by first condensing the resin to the late A or early B stage and thereafter, adding an agent, such as oxalic acid, to remove the sodium oxalate so formed by means of filtration. In addition to being laborious and expensive, the adhesive obtained has been found to be slow curing.

Wiegand et al in Canadian Pat. No. 735,389 issued May 31, 1963 discloses an alkaline process in which water soluble alkaline kraft or lignosulfonate is mixed with water soluble high molecular weight PF. The water soluble mixture at high solids content may be used as a tackifying agent and adhesive for particleboard and fibreboard. The unique reactivity of NH₄SSL towards PF was, however, not recognized as the best results were obtained with NaSSL and kraft lignin at high pH. The mixture as disclosed is slow curing at a temperature of 230° C. which was utilized to cure particleboard (normally cured 170° C.) with a product of low strength being obtained even with a large resin content. In addition, the SSL-PF could not be used as an additive where the SSL and PF were found incompatible. The compatibility, water solubility and mixing ratio considerations as taught by Wiegand et al are not considered controlling in accordance with our invention.

Shen et al in U.S. Pat. No. 4,265,846 issued May 5, 1981 recognized that chemical modification to the spent sulfite liquor is not desirable as it necessarily contributes to increased resin cost. Crude or low molecular weight ammonium based spent sulfite liquor was thus used alone as the thermosetting binder and hot pressed at 170° C. or higher for a time sufficient to decompose the NH₄SSL into lignosulfonic acid and ammonia gas, whereafter the acid condensed and polymerized in the presence of liqnocellulosic materials to produce an exterior grade wood composite product. However, this decomposition process is slow, as approximately 14 minutes passing at 210° C. is required to produce an exterior grade 11.1 mm waferboard and approximately 8 minutes required when low molecular weight NH₄SSL is utilized as the binder. Due to the long press cycles when compared with PF binders that have a press cycle of 3 to 4 minutes, it is unlikely this technique will receive signifigant acceptance by the industry. Moreover, NH₄SSL as a resin suffers the disadvantage or resin sticking to the metal caul plates used during heat application and pressing. It has also been observed that if the carbohydrates are removed, NH₄SSL looses its adhesive properties.

SUMMARY OF THE INVENTION

The NH₄SSL-PF thermosetting binder of this invention is inexpensive, fast curing, and unlike prior techniques, can be produced in a one step operation and does not require modification or addition of alkali or buffer. Moreover, it has been found to have superior adhesion characteristics over NaSSL-PF and CaSSL-PF resins and also NH₄SSL when used alone as a binder.

We have also found that the binder produced in accordance with our invention is less sensitive to fluctuations in pH when compared to composite wood products which employ NH₄SSL alone as the binder, and that the current Canadian Standards Association requirements as set for particleboard and waferboard can be met using crude or fractionated NH₄SSL.

In accordance with our invention, lignocellulosic materials are bonded into a formed lignocellulosic product such as particleboard or waferboard by mixing a thermosetting binder comprising an acid dispersion of ammonium based spent sulfite liquor, phenol and formaldehyde with said materials, and subjecting said mixtures to sufficient heat and temperature to cure said binder.

Although phenol and formaldehyde can be added to the NH₄SSL separately, it is preferred that they be added together as phenol-formaldehyde. As indicated previously, phenol-formaldehyde precipitates when in acidic solution with NH₄SSL and thus it is important to maintain the two in dispersion through rigourous stiring or agitation as otherwise the NH₄SSL-PF separates with the loss of its adhesive properties. The phenol resin thus can be added direct to the acid NH₄SSL.

The acidic NH₄SSL-PF dispersion can also be in powder form and obtained by spray-drying the two together, or by dry mixing these previously separately dried components. It will also be apparant that NH₄SSL and PF can be dispersed as contemplated in the process of our invention by adding them separately to a blender which has been previously charged with the lignocellulosic material.

While the ratio of NH₄SSL measured on a dry weight basis can vary widely when practicing this process, say from 10:90 to 90:10, from a commercial standpoint a ratio of from 80:20 to 50:50 is preferred. Similarly, while acceptable modulus of rupture (MOR) tests on waferboard and particleboard have been obtained over a pH range from 3 to 7 for the NH₄SSL-PF binder, a commercial operating range from pH 4 to 6 using crude NH₄SSL and commercially available phenol-formaldahyde is also preferred.

Although crude NH₄SSL can be used in the binder of this invention, we have additionally found that improved adhesive characteristics are obtained when fractionated low molecular weight NH₄SSL is employed.

In the following examples, unless otherwise indicated, all data obtained was based on aspen-poplar short wafers, a resin content expressed as a percentage of the wood content measured on a dry weight basis, and a press or platen temperature of 210° C. at 3.45 MPa when applied to a 11.1 mm waferboard having a 640 Kg/m density.

EXAMPLE 1

Comparison tests were run using crude and low fractionated NH₄SSL binder as the resin type (U.S. Pat. No. 4,265,846) and two dispersed NH₄SSL-PF binders; one using a crude NH₄SSL component and the other a low fractionated NH₄SSL component, with the results being set forth in table 1. Compared to crude and fractionated NH₄SSL resin, the NH₄SSL-PF resin had preferred MOR(dry) and Aged MOR(wet) test results. The CSA standard for waferboard is also included in this table.

TABLE 1

| RESIN TYPE | RESIN CONTENT (%) | PRESS TIME (MIN.) | DRY MOR (MPa) | WET AGED MOR (MPa) |
|---|---|---|---|---|
| NH₄SSL (pH 2.5) | 4 | 15 | 19.4 | 9.3 |
| NH₄SSL (low fractionated) | 2.5 | 8 | 21.3 | 9.9 |
| NH₄SSL (50%) PF(50) pH 6 | 2.5 | 3 | 23.2 | 11.6 |
| NH₄SSL (50%) (low fractionated) PF (50%) | 2.5 | 3 | 24.5 | 13.3 |
| CSA STANDARD Can 3.0188.2-M78 | — | — | 14.0 | 7.0 |

EXAMPLE 2

Using a press cycle of 5 minutes, waferboards bonded with a SSL cooking base containing 70% PF component and 30% SSL Component based on dry weight were compared. As seen in table 2, all three SSL cooking bases passed the modulus elasticity (MOE) and internal bonding (IB) tests required by CSA, but both the NaSSL-PF and CaSSL-PF failed the Aged MOR, supporting the conclusion NH₄SSL of our dispersion process has some unique reactive properties heretofore not recognized.

TABLE 2

| RESIN TYPE | DRY MOR (MPa) | WET AGED MOR (MPa) | MOE (GPa) | IB (kPa) |
|---|---|---|---|---|
| NH₄SSL-PF | 22.8 | 11.2 | 3.94 | 455 |
| NaSSL-PF | 17.9 | 0 | 3.10 | 350 |
| CaSSl-PF | 20.8 | 2.8 | 4.10 | 450 |
| CSA STANDARD Can 3.0188.2-M78 | 14 | 7.0 | 2.70 | 280 |

EXAMPLE 3

Table 3 sets forth the effect pH has on the adhesive properties of crude NH₄SSL resin and the NH₄SSL-PF dispersed resin of this invention where the dispersion ratio on a dry weight basis is 70% NH SSL and 30% PF. It has been further determined that the relationship of pH to NH₄SSL-PF is substantially linear for MOR and Aged MOR whilst there is a significant drop in Aged MOR for NH₄SSL alone when the pH is above 4.

TABLE 3

| RESIN TYPE | PRESS TIME | pH | MOR | Aged MOR |
|---|---|---|---|---|
| NH₄SSL | 8 | 3 | 21 | 9 |
| NH₄SSL | 8 | 5 | 18 | 3 |
| NH₄SSL-PF | 5 | 3 | 23 | 13 |
| NH₄SSL-PF | 5 | 7 | 21 | 9 |
| CSA STANDARD Can 3.0188.2-M78 | | | 14.0 | 7 |

EXAMPLE 4

A test was run to determine the effect of molecular weight on the bonding properties of NH SSL-PF, using a press time of 5 minutes each.

The reactivity of NH₄SSL-PF increased when low molecular weight NH₄SSL was used. The reactivity was excellent whether or not the low molecular weight NH₄SSL contained some reducing carbohydrate. When crude NH₄SSL alone was utilized as adhesive (U.S. Pat. No. 4,265,846) the presence of carbohydrate was found indispensable to the bonding. The instability of the NH₄SSL-PF mixtures is however increased with utilization of low molecular weight NH₄SSL with a high level of carbohydrates. Higher pH and a small quantity of organic solvent, such as dimethyl formaldehyde was found to help stabilize the resin mixture.

TABLE 4

| RESIN TYPE | MOR (MPa) | Aged MOR (MPa) |
|---|---|---|
| Crude NH₄SSL with 30% PF | 23 | 11 |
| High molecular weight NH₄SSL with 30% PF | 22 | 10 |
| Low molecular weight NH₄SSL with 30% PF | 26 | 13 |
| Desugarized low molecular weight NH₄SSL with 30% PF | 24 | 12 |

EXAMPLE 5

Well cured phenol-formaldehyde adhesive is a stable cross-linked polymer which is resistant to water hydrolysis and will not emit formaldehyde gas. However, during manufacture of wood composites, if very short press cycles are used or if for some reason, poor quality control is exercised, the phenol-formaldehyde resin may be undercured. As a result the undercured phenol-formaldehyde bonded product will emit small amounts of formaldehyde gas. During experimentation with NH₄SSL-PF resin adhesive, it was observed that the lignin-based adhesive emits much less formaldehyde as compared to phenol-formaldehyde resin when "undercured" by the same conditions. Less phenolic resin alone would not appear to explain this large reduction in formaldehyde emission. It is beleived that the ammonium ion from NH₄SSL reacts with the free formaldehyde to form a stable hexamethlenetertramine complex. This formaldehyde scavenging effect of NH₄SSL is illustrated on table 5 where interior grade particleboard was pressed employing a 8.5% resin content and a 10% mat moisture content. Formaldehyde emission was measured using the 2-hour Desiccator Test.

TABLE 5

| RESIN TYPE | TEMP. (C.) | TIME (MIN.) | MOR (GPa) | FORMALDAHYDE EMISSION (mg/l) |
|---|---|---|---|---|
| PF | 210 | 4 | 25.1 | 0.31 |
| NH4SSL-PF | 210 | 4 | 20.1 | 0.06 |

EXAMPLE 6

While PF resins are utilized exclusively for the manufacture of exterior grade wood composite products, it was found that NH4SSL-PF can be utilized under certain conditions for the manufacture of interior grade wood composites. Table 6 summarizes the test results for particleboards bonded with a short press cycle of 3-4 minutes at 180° and 210° C. The resin coated particles were pressed at 10 percent moisture content (MC). The board had no wet strength as it disintegrated in boiling water. It was however suprising to find that even with this short press cycle and high M.C. content (waferboard is made at 3 to 5 percent M.C.) a board which would meet CSA requirements for interior grade particleboard was obtained. Interestingly, the NH4SSL-PF resin cost at current market cost was less expensive than the urea-formaldehyde cost.

TABLE 6

| RESIN TYPE | TEMP. (°C.) | TIME (MIN.) | MOR (GPa) | Aged MOR (GPa) | IB (kPa) |
|---|---|---|---|---|---|
| NH4SSL-PF (70:30) | 210 | 3 | 21 | 0 | 530 |
| NH4SSL-PF (60:40) | 180 | 4 | 19 | 0 | 521 |
| CSA STANDARD Can 3-0188.1-M78 | | | 14 | | |

We claim:

1. A method of binding lignocellulosic materials into a formed lignocellulosic product comprising the steps of mixing a thermosetting binder consisting essentially of (a) an acidic dispersion of ammonium based spent sulfite liquor, phenol and formaldehyde with said materials, and subjecting said mixture to sufficient temperature and pressure to set said binder.

2. The method as claimed in claim 1, wherein the phenol and formaldehyde is phenol-formaldehyde.

3. The method as claimed in claim 2, wherein said binder is liquid and said phenol-formaldehyde is suspended in said ammonium based spent sulfite liquors.

4. The method as claimed in claim 2, wherein said binder is a spray-dried powder of said phenol-formaldehyde and said ammonium based spent sulfite liquor.

5. The method as claimed in claim 2, 3 or 4, wherein the ratio of said ammonium based spent sulfite liquor to said phenol-formaldehyde on a dry weight basis is from 10:90 to 90:10.

6. The method as claimed in claim 2, 3 or 4, wherein the pH of said binder is from 3 to 7.

7. The method as claimed in claim 2, 3 or 4, wherein the pH of said binder is from 4 to 7.

8. The method as claimed in claim 2, 3 or 4, wherein said binder is cured at a temperature from 150° C. to 230° C.

9. The method as claimed in claim 1, wherein the ammonium based spent sulfite liquor component and the said phenol and formaldehyde component of said thermosetting binder are each added seperately to said materials.

10. The method as claimed in claim 2, 3 or 4, wherein the ratio of said ammonium based spent sulfite liquor to said phenol-formaldehyde on a dry weight basis is from 80:20 to 50:50.

11. The method as claimed in claim 2, 3 or 4, wherein the ammonium based spent sulfite liquor has been fractioned to provide an increased concentration of low molecular weight constituents.

12. The method of binding lignocellulosic materials into a formed lignocellulosic product comprising the step of mixing a thermosetting binder consisting essentially of a dispersion of an acidic ammonium based spent sulfite liquor and a phenolic resin with said materials, and subjecting said mixture to a sufficient temperature and pressure to set said binder.

13. The method as claimed in claim 12 wherein the pH of said binder is from about 3 to about 7.

14. A thermosetting resinous binder for use in bonding lignocellulosic materials together which consists essentially of (a) an acidic dispersion of phenol-formaldehyde and ammonium based spent sulfite liquor.

15. The thermosetting resinous binder claimed in claim 14, wherein the pH of said binder is from 3 to 7 and the ratio of said ammonium based spent sulfite liquor to said phenol-formaldehyde on a dry weight basis is from 10:90 to 90:10.

16. The thermosetting resinous binder as claimed in claim 14 wherein said binder is one of a liquid dispersion and a powder dispersion, the pH of said binder is from 4 to 7 and the percentage of phenol-formaldehyde to said ammonium based spent sulfite liquor on a dry weight basis is from 20% to 50%.

* * * * *